US012711547B2

(12) United States Patent
Antonio Acuña-Rohter et al.

(10) Patent No.: US 12,711,547 B2
(45) **Date of Patent: *Aug. 18, 2026**

(54) MULTI-MODAL TRADE EXECUTION WITH SMART ORDER ROUTING

(71) Applicant: Chicago Mercantile Exchange Inc., Chicago, IL (US)

(72) Inventors: José Antonio Acuña-Rohter, Des Plaines, IL (US); Pearce Peck-Walden, Chicago, IL (US); Ari Studnitzer, Northbrook, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/524,774

(22) Filed: Nov. 30, 2023

(65) Prior Publication Data

US 2024/0095828 A1 Mar. 21, 2024

Related U.S. Application Data

(63) Continuation of application No. 17/497,433, filed on Oct. 8, 2021, now Pat. No. 11,861,703, which is a (Continued)

(51) Int. Cl.
*G06Q 40/00* (2023.01)
*G06Q 40/04* (2012.01)

(52) U.S. Cl.
CPC .................................... *G06Q 40/04* (2013.01)

(58) Field of Classification Search
CPC ...................................................... G06Q 40/04
See application file for complete search history.

(56) References Cited

U.S. PATENT DOCUMENTS 4,093,823 A 6/1978 Chu
5,077,665 A 12/1991 Silverman et al.
(Continued)

FOREIGN PATENT DOCUMENTS

EP 0411748 A2 2/1991
JP 2002-183446 6/2002
(Continued)

OTHER PUBLICATIONS

Viswanathan et al., "Market architecture: limit-order books versus dealership markets," Journal of Financial Markets 5 (2002) 127-167 (Year: 2002).*
(Continued)

*Primary Examiner* — Abhishek Vyas
*Assistant Examiner* — Illiam B. Bunker
(74) *Attorney, Agent, or Firm* — Lempia Summerfield Katz LLC

(57) ABSTRACT

The disclosed embodiments relate to systems and methods for matching orders for a financial product. A first order for a financial product is received. The first order includes a preference for a first order book. An order processer selects a first hardware match processor based on the preference. A first hardware match processor attempts to match the first order with a previously received order in the first order book. A second order for the financial product is received. The second order includes a preference for a second order book. The order processor selects a second hardware match processor based on the preference. A second hardware match processor attempts to match the second order with a previously received order in the second order book. The first and second hardware match processors use different matching algorithms.

20 Claims, 8 Drawing Sheets

Related U.S. Application Data continuation of application No. 15/132,676, filed on Apr. 19, 2016, now Pat. No. 11,164,248.

(60) Provisional application No. 62/240,282, filed on Oct. 12, 2015.

(56) References Cited

U.S. PATENT DOCUMENTS 5,297,032 A 3/1994 Trojan et al.
5,465,308 A 11/1995 Hutcheson et al.
5,557,780 A 9/1996 Edwards et al.
5,727,165 A 3/1998 Ordish et al.
5,909,570 A 6/1999 Webber
5,953,503 A 9/1999 Mitzenmacher et al.
6,031,577 A 2/2000 Ozkan et al.
6,088,699 A 7/2000 Gampper et al.
6,131,087 A 10/2000 Luke et al.
6,195,024 B1 2/2001 Fallon
6,278,982 B1 8/2001 Korhammer et al.
6,309,424 B1 10/2001 Fallon
6,347,307 B1 2/2002 Sandhu et al.
6,463,470 B1 10/2002 Mohaban et al.
6,466,944 B1 10/2002 Stokes
6,549,949 B1 4/2003 Bowman-Amuah
6,597,812 B1 7/2003 Fallon et al.
6,601,104 B1 7/2003 Fallon
6,604,158 B1 8/2003 Fallon
6,624,761 B2 9/2003 Fallon
6,694,054 B1 2/2004 Gardes et al.
6,748,457 B2 6/2004 Fallon et al.
6,801,201 B2 10/2004 Escher
6,950,445 B2 9/2005 Svanbro et al.
6,963,855 B1 11/2005 Borzenko
7,082,398 B1 7/2006 Apple et al.
7,130,913 B2 10/2006 Fallon
7,143,191 B2 11/2006 Chuah et al.
7,161,506 B2 1/2007 Fallon
7,181,608 B2 2/2007 Fallon et al.
7,228,129 B1 6/2007 Ward et al.
7,321,937 B2 1/2008 Fallon
7,352,300 B2 4/2008 Fallon
7,358,867 B2 4/2008 Fallon
7,376,772 B2 5/2008 Fallon
7,378,992 B2 5/2008 Fallon
7,386,046 B2 6/2008 Fallon et al.
7,395,345 B2 7/2008 Fallon
7,400,274 B2 7/2008 Fallon et al.
7,415,530 B2 8/2008 Fallon
7,417,568 B2 8/2008 Fallon et al.
7,487,125 B2 * 2/2009 Littlewood ............ G06Q 40/04 705/37
7,552,077 B1 6/2009 Schluetter et al.
7,565,319 B1 7/2009 Strauss et al.
7,636,703 B2 12/2009 Taylor
7,685,049 B1 3/2010 Singer
7,831,491 B2 11/2010 Newell et al.
7,840,482 B2 11/2010 Singla et al.
7,853,499 B2 12/2010 Czupek et al.
7,899,749 B1 3/2011 Studnitzer et al.
7,921,046 B2 4/2011 Parsons et al.
7,954,114 B2 5/2011 Chamberlain et al.
8,027,904 B2 9/2011 O'Callahan
8,036,929 B1 10/2011 Reisman
8,041,626 B2 10/2011 Kirwin et al.
8,060,435 B2 11/2011 Kirwin et al.
8,069,102 B2 11/2011 Indeck et al.
8,108,299 B1 1/2012 Waelbroeck
8,131,625 B2 3/2012 Langridge
8,296,217 B1 10/2012 Howorka
8,296,221 B1 * 10/2012 Waelbroeck ........... G06Q 40/04 705/37
8,407,122 B2 3/2013 Parsons et al.
8,458,081 B2 6/2013 Parsons et al.
8,548,900 B1 10/2013 Glackin et al.
8,566,218 B2 10/2013 Czupek
8,732,062 B2 5/2014 Czupek
2001/0047473 A1 11/2001 Fallon
2001/0052038 A1 12/2001 Fallon et al.
2002/0004774 A1 1/2002 Defarlo
2002/0038276 A1 3/2002 Buhannic et al.
2002/0080871 A1 6/2002 Fallon et al.
2002/0087451 A1 * 7/2002 Rieger .................. G06Q 40/04 705/37
2002/0099647 A1 7/2002 Howorka et al.
2002/0107748 A1 8/2002 Boies et al.
2002/0128938 A1 9/2002 Ronald Schofield et al.
2002/0128958 A1 9/2002 Slone
2002/0191692 A1 12/2002 Fallon et al.
2003/0009411 A1 1/2003 Ram et al.
2003/0033212 A1 2/2003 Sandhu et al.
2003/0093351 A1 5/2003 Sarabanchong
2003/0177082 A1 9/2003 Buckwalter
2003/0225672 A1 12/2003 Hughes, Jr. et al.
2003/0225673 A1 12/2003 Hughes, Jr. et al.
2003/0225674 A1 12/2003 Hughes, Jr. et al.
2003/0225857 A1 12/2003 Flynn et al.
2004/0042506 A1 3/2004 Fallon et al.
2004/0059666 A1 3/2004 Waelbroeck et al.
2004/0088242 A1 5/2004 Ascher et al.
2004/0107123 A1 6/2004 Haffner et al.
2004/0111358 A1 6/2004 Lange et al.
2004/0143538 A1 7/2004 Korhammer et al.
2004/0210511 A1 10/2004 Waelbroeck et al.
2004/0240486 A1 12/2004 Venkatesh et al.
2005/0096999 A1 5/2005 Newell et al.
2005/0149428 A1 7/2005 Gooch et al.
2005/0154660 A1 7/2005 Sturm et al.
2005/0171889 A1 8/2005 Daley et al.
2005/0171890 A1 8/2005 Daley et al.
2005/0228735 A1 10/2005 Duquette
2006/0015448 A1 1/2006 Burkhardt et al.
2006/0036448 A1 2/2006 Haynie et al.
2006/0036531 A1 2/2006 Jackson et al.
2006/0069635 A1 3/2006 Ram et al.
2006/0095360 A1 5/2006 Apple et al.
2006/0106707 A1 5/2006 Shetty et al.
2006/0106708 A1 5/2006 Abushaban et al.
2006/0184447 A1 8/2006 Nieboer et al.
2006/0259403 A1 * 11/2006 Monroe ................. G06Q 20/10 705/37
2007/0043939 A1 2/2007 Fallon et al.
2007/0050514 A1 3/2007 Fallon
2007/0050515 A1 3/2007 Fallon
2007/0067483 A1 3/2007 Fallon
2007/0083746 A1 4/2007 Fallon et al.
2007/0100732 A1 5/2007 Ibbotson et al.
2007/0118460 A1 5/2007 Bauerschmidt et al.
2007/0174209 A1 7/2007 Fallon et al.
2007/0192232 A1 8/2007 Czupek
2008/0010183 A1 1/2008 Holmes et al.
2008/0091586 A1 4/2008 Cottrell
2008/0126853 A1 5/2008 Callaway et al.
2008/0232457 A1 9/2008 Fallon et al.
2009/0012892 A1 1/2009 Biase
2009/0076940 A1 3/2009 Patel et al.
2009/0154545 A1 6/2009 Fallon et al.
2009/0171950 A1 7/2009 Lunenfeld
2009/0182683 A1 7/2009 Taylor et al.
2009/0254473 A1 * 10/2009 Waelbroeck ........... G06Q 40/03 705/37
2009/0287628 A1 11/2009 Indeck et al.
2010/0023458 A1 1/2010 Kociuba
2010/0088214 A1 * 4/2010 Czupek .................. G06Q 40/04 705/37
2010/0153254 A1 6/2010 Shalen
2010/0211497 A1 * 8/2010 Kessler .................. G06Q 40/04 705/37
2010/0241758 A1 9/2010 Oddie et al.
2010/0293087 A1 * 11/2010 Troxel, Jr. ............ G06Q 40/04 705/37
2011/0119170 A1 5/2011 Winter et al.
2011/0145447 A1 6/2011 Dimond
2011/0178911 A1 7/2011 Parsons et al.

(56) References Cited

U.S. PATENT DOCUMENTS

| | | | | |
|---|---|---|---|---|
| 2011/0178912 | A1 | 7/2011 | Parsons et al. | |
| 2011/0178917 | A1 | 7/2011 | Parsons et al. | |
| 2011/0178918 | A1 | 7/2011 | Parsons et al. | |
| 2011/0178919 | A1 | 7/2011 | Parsons et al. | |
| 2011/0178957 | A1 | 7/2011 | Parsons et al. | |
| 2011/0179050 | A1 | 7/2011 | Parsons et al. | |
| 2011/0184844 | A1 | 7/2011 | Parsons et al. | |
| 2011/0238556 | A1 | 9/2011 | Harmaty | |
| 2011/0246351 | A1 | 10/2011 | Sulavka | |
| 2011/0264578 | A1 | 10/2011 | Chapman et al. | |
| 2011/0320335 | A1 | 12/2011 | Gorelik et al. | |
| 2012/0047062 | A1 | 2/2012 | Robinson | |
| 2012/0089496 | A1 | 4/2012 | Taylor et al. | |
| 2012/0089497 | A1 | 4/2012 | Taylor et al. | |
| 2012/0095893 | A1 | 4/2012 | Taylor et al. | |
| 2012/0246052 | A1 | 9/2012 | Taylor et al. | |
| 2012/0259757 | A1 | 10/2012 | Nager | |
| 2012/0290460 | A1 | 11/2012 | Curry, Jr. et al. | |
| 2012/0323757 | A1 * | 12/2012 | Monroe | G06Q 40/04 705/37 |
| 2013/0030963 | A1 | 1/2013 | Cramer et al. | |
| 2013/0226764 | A1 | 8/2013 | Battyani | |
| 2014/0006243 | A1 * | 1/2014 | Boudreault | G06Q 40/04 705/37 |
| 2014/0143121 | A1 | 5/2014 | Stevens | |
| 2014/0279342 | A1 | 9/2014 | Maynard | |
| 2014/0289094 | A1 | 9/2014 | Gaber et al. | |
| 2014/0304138 | A1 * | 10/2014 | Czupek | G06Q 40/06 705/37 |
| 2015/0127516 | A1 | 5/2015 | Studnitzer et al. | |
| 2015/0127518 | A1 * | 5/2015 | Loveless | G06Q 40/04 705/37 |
| 2019/0236704 | A1 * | 8/2019 | Venkataraman | G06Q 40/04 |

FOREIGN PATENT DOCUMENTS

| | | | | |
|---|---|---|---|---|
| JP | 2002-183450 | | 6/2002 | |
| JP | 2002-366880 | | 12/2002 | |
| WO | WO-0108065 | A1 * | 2/2001 | G06Q 40/00 |
| WO | WO-0237380 | A1 * | 5/2002 | G06Q 40/04 |
| WO | WO-2005048063 | A2 * | 5/2005 | G06Q 40/04 |
| WO | WO-2007041393 | A2 * | 4/2007 | G06Q 40/04 |
| WO | WO-2008013917 | A2 * | 1/2008 | G06Q 30/06 |
| WO | 2008/154306 | | 12/2008 | |
| WO | 2011081711 | A2 | 7/2011 | |
| WO | 2011/134975 | | 11/2011 | |
| WO | 2012/079041 | | 6/2012 | |
| WO | 2014210314 | A1 | 12/2014 | |
| WO | 2015/138544 | A1 | 9/2015 | |

OTHER PUBLICATIONS

Tirea et al., "Multi-Agent Stock Trading Algorithm Model," 13th International Symposium on Symbolic and Numeric Algorithms for Scientific Computing, 2011 (Year: 2011).*

"A Scalable Fault-Tolerant Limit Order Book", Rutgers University, Jun. 9, 2007, 3 pages, http://web.archive.org/web/20070609124316/http://www.cs.rutgers.edu/~rmartin/projects/market/index.html.

"Asynchronous Array of Simple Processors", Wikipedia, Feb. 5, 2009, 4 pages, http://web.archive.org/web/20090205100510/http://en.wikipedia.org/wiki/Asynchronous_array_of_simple_processors.

"Functional Definition of LIFFE CONNECT", Atos Euronext Market Solutions, 2005, Version 9, Issued Version 10.0, 2 pages.

"High Performance Trading—Deployment of Leading Edge Technology Thinking", Argon Design, 2013, 2 pages.

"Impact Cost", National Stock Exchange of India Ltd., Sep. 25, 2011, 2 pages, http://web.archive.org/web/20110925011346/http://nseindia.com/products/content/equities/indices/impact_cost.htm.

"Message Encoding/Decoding Using Templated Parameters," Arun K. Nanda et al., patent application 40 pages, available as early as Apr. 19, 2016.

"Real-time Operating System", Wikipedia, Retrieved May 19, 2013, http://en.wikipedia.org/wiki/Real-time_operating_System, 6 pages.

"Solace Message Routers and Cisco Ethernet Switches: Unified Infrastructure for Financial Services Middleware", White Paper, 2010, 15 pages, Cisco Systems, Inc.

"What is a Real-Time Operating System (RTOS)?", National Instruments, Oct. 2, 2012, 2 pages.

Benjamin Geib, "Investigating Low Latency Trading with an HT Enabled FPGA", Universitat Heidelberg, Aug. 2, 2011, 17 pages.

C. Leber et al., "High Frequency Trading Acceleration Using FPGAs", International Conference on Field Programmable Logic and Applications, 2011, 317-322.

Chicago Board of Trade, "How the e-cbot® Market Works", 2003, 29 pages.

Christensen, et al., "Prediction of Hidden Liquidity in the Limit Order Book of GLOBEX Futures," Journal of Trading, Summer, 2013. (Year: 2013).

Cisco Systems, Inc., "Design Best Practices for Latency Optimization", 1992-2007, 8 pages.

Corvil, "Nanosecond Latency Management", Whitepaper, 2011, 10 pages.

Ding-Ming Kwai et al., "Fault-Tolerant Processor Arrays Using Space and Time Redundancy", ICAPP 1996, pp. 303-310.

English translation of Japanese Office Action in JP 2006-538545, Jul. 6, 2010, 3 pages.

Examiner's Report in CA 2,544,856 dated Nov. 26, 2012, 5 pages.

Examiner's Report in CA2885377 dated May 13, 2015, 5 pages.

Functional Definition of LIFFE CONNECT for the Chicago Board of Trade, LIFFE CONNECT Version 7.2, Issued Version 1.0, 2003.

Functional Definition of LIFFE CONNECT, LIFFE CONNECT Version 9.0, Issued Version 2.0 by Nick Bishop/Angela Edwards, 2005.

Functional Definition of LIFFEE CONNECT for the Chicago Board of Trade, LIFFE CONNECT Version 7.1 CBOT, Issued Version 2.6, Dec. 2003.

Goud etal., "Limit Order Books," arXiv:1012.0349v4[q-fln. TR], 2013. (Year: 2013).

International Search Report and Written Opinion from, Application No. PCT/US2016/056343, Nov. 25, 2016, WO.

International Search Report and Written Opinion in PCT Application No. PCT/US08/03538 dated Jun. 12, 2008, 9 pages.

International Search Report and Written Opinion, from PCT/US2014/064001, Feb. 13, 2015, WO.

International Search Report from PCT/US04/37238 dated Jun. 13, 2008.

International Search Report in International Patent Application No. PCT/AU2009/000849, dated Aug. 6, 2009, 4 pages.

International Search Report in International Patent Application No. PCT/EP2011/056611, Jan. 20, 2012, 3 pages.

Leber et al., "How to Get World's Best Possible Ultra Low Latency in High Frequency Trading (Tick to Trade Method)", 2012.

Lockwood, et al., "A Low-Latency Library in FPGA Hardware for High-Frequency Trading (HFT)", 2012 IEEE 20th Annual Symposium on High-Performance Interconnects, 2012, pp. 9-16.

low-latency.com, "Groundbreaking Results for High Performance Trading with FPGA and x86 Technologies", Newswire, Sep. 25, 2013, 2 pages.

Office Action in Canadian Application 2,544,856 dated May 23, 2012, 4 pages.

Office Action in Canadian Application No. 2,544,856 dated Sep. 10, 2013, 8 pages.

Office Action in EP04810547.2 dated Sep. 13, 2010, 6 pages.

Renee Robbins, "Advantages of FPGAs", Control Engineering, Feb. 1, 2010, 5 pages.

Risca et al., "Trading Floor Architecture", Cisco Systems, 2008, 36 pages.

Scott Caudell, "Co-location, Performance Management and Technology Innovation for Ultra-low Latency Trading", High Performance Technologies for Trading, Apr. 2010, 5 pages, Issue 5.

Tse et al., "High Frequency Trading—Measurement, Detection and Response", Trading Strategy, Dec. 6, 2012, 12 pages.

Tse et al., "High Frequency Trading—The Good, The Bad, and The Regulation", Trading Strategy, Dec. 5, 2012, 7 pages.

(56) References Cited

OTHER PUBLICATIONS

Viswanathan et al., "Market architecture: limit-order books versus dealership markets", Journal of Financial Markets 5, 2002, pp. 127-167.
Wikipedia, "Real-time Business Intelligence", Retrieved May 19, 2013, 4 pages, http://en.wikipedia.org/wiki/Real-time_business_intelligence.

* cited by examiner

MULTI-MODAL TRADE EXECUTION WITH SMART ORDER ROUTING

RELATED APPLICATIONS

This application is a continuation under 37 C.F.R. § 1.53 (b) of U.S. patent application Ser. No. 17/497,433 filed Oct. 8, 2021, now U.S. Pat. No. 11,861,703, which is a continuation under 37 C.F.R. § 1.53 (b) of U.S. patent application Ser. No. 15/132,676 filed Apr. 19, 2016, now U.S. Pat. No. 11,164,248, which claims the benefit of the filing date under 35 U.S.C. § 119 (e) of Provisional U.S. Patent Application Ser. No. 62/240,282, filed on Oct. 12, 2015, all of which are hereby incorporated by reference in their entirety.

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting, and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow customers to submit orders and receive confirmations, market data, and other information electronically via a network. These "electronic" marketplaces have largely supplanted the pit based trading systems whereby the traders, or their representatives, all physically stand in a designated location, i.e., a trading pit, and trade with each other via oral and hand based communication. In contrast to the pit based trading system where like-minded buyers and sellers can readily find each other to trade, electronic marketplaces must electronically "match" the orders placed by buyers and sellers on behalf thereof. Electronic trading systems may offer a more efficient and transparent system of trading. Electronic trading systems may achieve more fair and equitable matching among traders as well as identify more opportunities to trade, thereby improving market liquidity.

DETAILED DESCRIPTION

Figure 1:
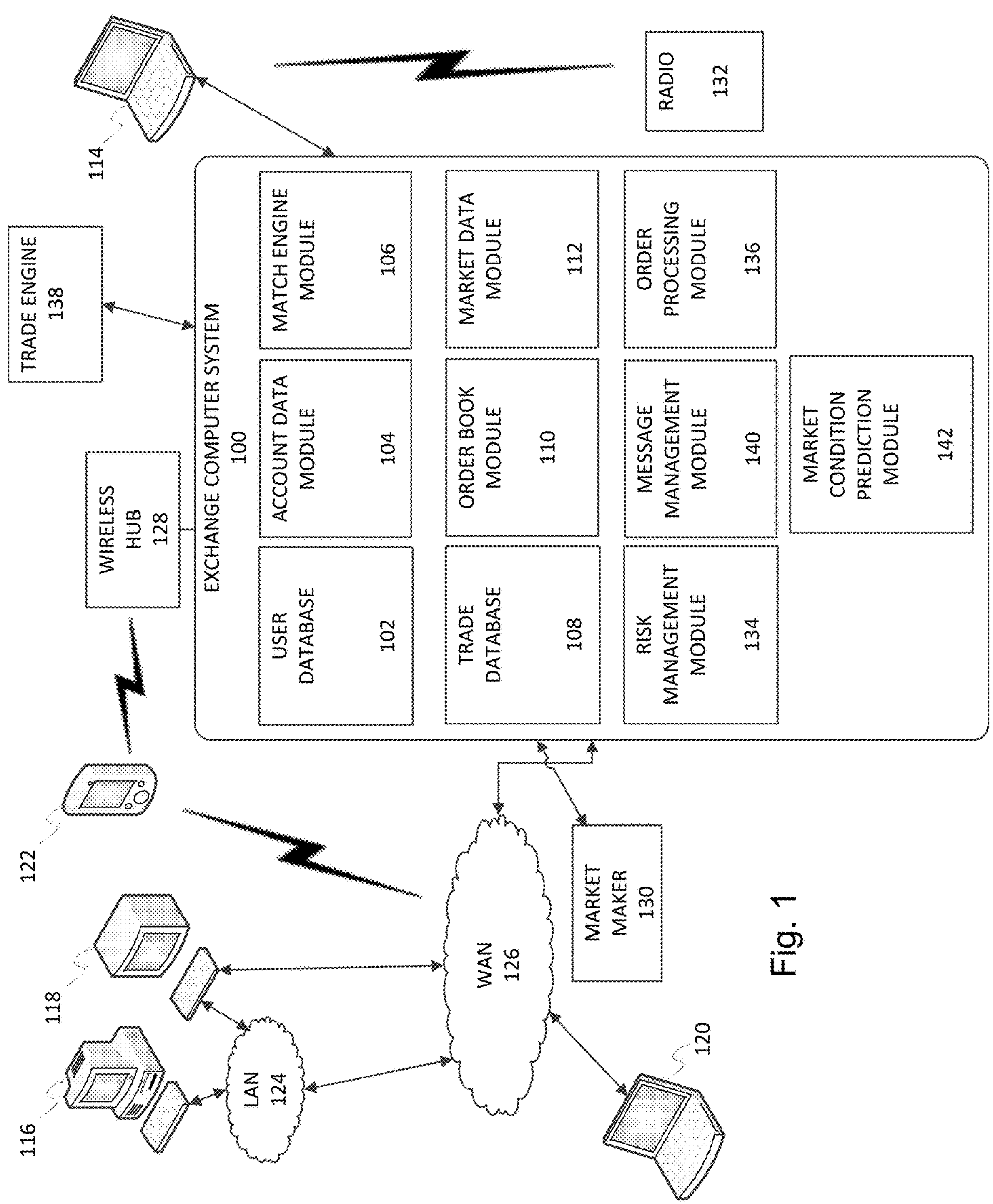
FIG. 1 depicts an illustrative computer network system that may be used to implement aspects of the disclosed embodiments.

The disclosed embodiments relate to systems and methods which match or otherwise allocate an incoming order to trade with "resting," i.e., previously received but not yet matched or otherwise not fully satisfied, orders, recognizing that the algorithm or rules by which the incoming order is matched/allocated may affect the operation of the market for the financial product being traded. In particular, the disclosed embodiments relate to Multi-Modal Trade Execution with Smart Order Routing which draws upon different matching algorithms e.g., the rules which dictate how a given order should be allocated among qualifying resting orders, depending upon market conditions, and multiple order books to create liquidity and improve the operation of the market.

For example, current execution platforms only have one mode of operation in terms of how they match orders for a given financial instrument. If a matching engine is operating under a particular, e.g., FIFO (First In First Out), matching algorithm, then the system may be stuck with that matching algorithm at least until customers can be adequately notified of a change. Customers or traders have an expectation when they transmit orders that the matching algorithm represented to be in use will in fact be used. An unexpected switch from FIFO to Pro Rata in the middle of a session would have far reaching consequences for not only existing/resting orders but also potential orders queued up by a customer, in transit, and subsequent orders. In certain embodiments, the system is configured to operate in multiple modes simultaneously to accept and match order with different matching algorithms as will be described.

An Exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some Exchange Computer Systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some Exchange Computer Systems cap the quantity of an incoming order that is allocated to a standing order on the basis of a priority for certain markets. In addition, some Exchange Computer Systems may give a preference to orders submitted by a trader who is designated as a market maker for the product. Other Exchange Computer Systems may use other criteria to determine whether orders submitted by a particular trader are given a preference. Typically, when the Exchange Computer System allocates a quantity of an incoming order to a plurality of identified orders at the same price, the trading host allocates a quantity of the incoming order to any orders that have been given priority. The Exchange Computer System thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein.

As mentioned above, changing the market structure midstream either through altering an allocation algorithm or other variable, may be disruptive. In certain embodiments, when deploying changes that will impact market structure, instead of launching that change for a product in a one time event/"big bang" fashion forcing customers to adopt the change by force and re-learn the market, the exchange system may allow for either side-by-side electronic execution or automatically shifting trading modes based on configuration parameters including but not limited to market states, extended trading hours vs. regular trading hours, etc.

In one embodiment an additional pool of liquidity may be introduced while at the same time maintaining legacy execution systems. In other words, the disclosed embodiments, may list the same financial instrument on two different matching engines (Either on the same server or separately) and/or using two separate order books. Liquidity refers to trade opportunities, i.e., if a trader wants to sell, there will be buyers willing to buy from the trader and if the trader wants to buy, there will be sellers willing to sell to the trader. Some traders may be lured into making offers to buy or sell by the matching algorithm that is being used thereby increasing liquidity. That is, if a trader prefers pro-rata over FIFO, then if FIFO is all that is provided, that trader may not submit orders but if pro-rata were to be offered, that trader will submit orders and thereby add liquidity. This additional liquidity may be referred to as an additional "pool" of liquidity. In one embodiment, customers may choose which execution style they would prefer in their orders. For customers that don't care or are not sophisticated enough to decide what market is best for them, a smart order router or order processor may be provided to route the customer's order to the best execution platform or select the best execution platform. This means that, in at least one embodiment, a customer's order may be automatically sent to a trade matching engine which has the best price and quantity for the instrument.

In one embodiment the smart order router may be replaced, or otherwise augmented or supplemented with implied order functionality and trades to link the multiple pools of liquidity. This will allow customers to attempt to match against their preferred method of execution, and if that method is not available, match their orders in an implied market thus always providing a unified pool of liquidity. In other embodiments, the two pools of liquidity may exist side by side and the marketplace may arbitrage prices.

In one embodiment the system may consist of a single matching engine and the mode of execution is determined by configurable parameters such as market state. For example, during regular open markets a matching engine might match orders according to one matching algorithm, such as in a FIFO manner, but in extended trading hours the matching algorithm might change to an alternative matching algorithm, such as a Pro-rata algorithm. The pools of liquidity remain unified, and the mode of execution changes based on the liquidity profile or configuration parameters. In this instance customers would not need to explicitly provide instructions for a preferred mode of execution. Resting orders which go from regular trading market state to an alternative matching algorithm state would be automatically considered for the present style of execution. Both execution platforms with different trading modes will send the same instrument for clearing.

While the disclosed embodiments may be discussed in relation to futures and/or options on futures trading, it will be appreciated that they may be applicable to any equity, options or futures trading system, e.g., exchange, Electronic Communication Network ("ECN"), Alternative Trading System ("ATS"), or Swap Execution Facility ("SEF"), or market now available or later developed, e.g., cash, Futures, etc., as well as any instrument traded thereon. It will be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. For example, an exchange must respond to inputs, such as trade orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participant are met, e.g., that transactional integrity and predictable system responses are maintained.

As was discussed above, electronic trading systems ideally attempt to offer an objective, efficient, fair, and balanced market where market prices reflect a true consensus of the value of products traded among the market participants, where the intentional or unintentional influence of human interaction is minimized if not eliminated, and where unfair or inequitable advantages with respect to information access are minimized if not eliminated.

Further, as discussed above, an exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g., traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e., by the Exchange's matching engine, to execute a trade. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product. A Continuous market order book is an order book made up of limit orders what is processed continuously as time moves forward.

Frequent group auctions (or micro group auctions) are similar to the continuous market order book but with two departures: (i) time is treated as discrete, not continuous; and (ii) orders are processed as a group, using a uniform-price auction, instead of serially in order of receipt. The trading day is divided into equal-length discrete time intervals, each of length $\tau>0$. The parameter $\tau$ may be referred to as the group length and to the intervals as group intervals. A generic group interval may be referred to either using the interval, generically $(0, \tau]$, or using the ending time, generically t. At any moment in time during a group interval, traders (i.e., investors or trading firms) may submit offers to buy and sell shares of stock in the form of limit orders and market orders. Just as in the continuous market, a limit order is a price-quantity pair expressing an offer to buy or sell a specific quantity at a specific price, and a market order specifies a quantity but not a price. At the end of each group interval, the exchange groups all outstanding orders—both new orders received during this interval, and orders outstanding from previous intervals—and computes the aggregate demand and supply functions out of all bids and asks, respectively. If demand and supply do not intersect, then there is no trade and all orders remain outstanding for the next group auction. If demand and supply do intersect, then the market clears where supply equals demand, with all transactions occurring at the same price—i.e., at a uniform price. Other types of order books or markets may be used. For example, an order book without limits and/or banding, or an order book that does not generate market data.

In the exemplary embodiments, all transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. See U.S. patent application Ser. No. 14/074,675, filed on Nov. 7, 2013, published as U.S. Patent Application Publication No. 2015/0127516 A1, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, will attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book. A match engine/match processor may be a hardware matching processor that is part of a transaction processing system. A data transaction processing system in which data items are transacted by a hardware matching processor that matches electronic data transaction request messages for the same one of the data items based on multiple transaction parameters from different client computers over a data communication network.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e., market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. For example, an order for a volatility options quoted contract may be matched against another suitable order for that contract. This is referred to as "implication" where a given order for a financial instrument may be matched via a combination of suitable counter orders for financial instruments which share common, or otherwise interdependent, financial variables.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

In general, advertising implied opportunities will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate, as will be described in more detail below, one or more previously received, but not yet matched, orders, i.e. limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the Exchange Computer System identifies that an incoming market order may be filled by a combination of multiple resting orders, e.g., the resting order at the best price does only partially fills the incoming order, the Exchange Computer System may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the Exchange for multiple financial products. Similarly, if the Exchange Computer System identifies multiple orders contra to the incoming limit order and that have an identical price which is favorable to the price of the incoming order, i.e., the price is equal to or better, e.g. lower if the incoming order is a buy or higher if the incoming order is a sell, than the price of the incoming order, the Exchange Computer System may allocate the quantity of the incoming order among such identified orders in accordance with the matching algorithms as, for example, may be defined in the specification of the particular financial product or defined by the Exchange for multiple financial products.

In certain embodiments, the allocation or matching algorithms may take into consideration if the order is "real" (explicit) or implicit). As discussed below, these algorithms may include multiple strategies that may be presented transparently to the customers so that they may be aware of how the match engine operates. Since implied orders are synthetically created (and not received), they may not correspond to the FIFO strategy. In such a scenario, the implied orders may be treated as junior to the real orders. Alternatively, the match engine may treat the implied order as an extension of the original real order and give the implied order the same time priority. These scenarios and others are described below.

As was noted above, an Exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some Exchange Computer Systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some Exchange Computer Systems cap the quantity of an incoming order that is allocated to a standing order on the basis of a priority for certain markets. In addition, some Exchange Computer Systems may give a preference to orders submitted by a trader who is designated as a market maker for the product. Other Exchange Computer Systems may use other criteria to determine whether orders submitted by a particular trader are given a preference. Typically, when the Exchange Computer System allocates a quantity of an incoming order to a plurality of identified orders at the same price, the trading host allocates a quantity of the incoming order to any orders that have been given priority. The Exchange Computer System thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out-FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula: (Order volume/Matching volume) *Tradable volume. The result is rounded down (for example, 21.99999999 becomes 21) unless the result is less than 1, when it becomes 1.
7. If tradable volume remains when the last order in the list had been allocated to, return to step 3.
   Note: The matching list is not re-sorted, even though the volume has changed.

The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula: (Order volume/Matching volume) *Tradable volume. The result is rounded down to the nearest lot (for example, 21.99999999 becomes 21) unless the result is less than the defined threshold in which case it is rounded down to 0.
7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence. Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may be considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the Exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, Exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata. The hybrid system discussed above switches between FIFO and pro rata based on a condition of the market.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop, or other computers, such as the example computer 200 described below with respect to FIG. 2. A user database 102 may be provided which includes information identifying traders and other users of exchange computer system 100, such as account numbers or identifiers, usernames and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous market, or also operate as an order accumulation buffer for a group market.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. A market condition prediction module 142 may be included to generate transaction processing system latency estimates, as discussed herein. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the market condition prediction module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example, the modules may be embodied as part of an exchange 100 for financial instruments.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a Ti line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Of course, numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more Gateway 710 devices, modems, the computers, or terminals of one or more traders, etc.

Figure 2:
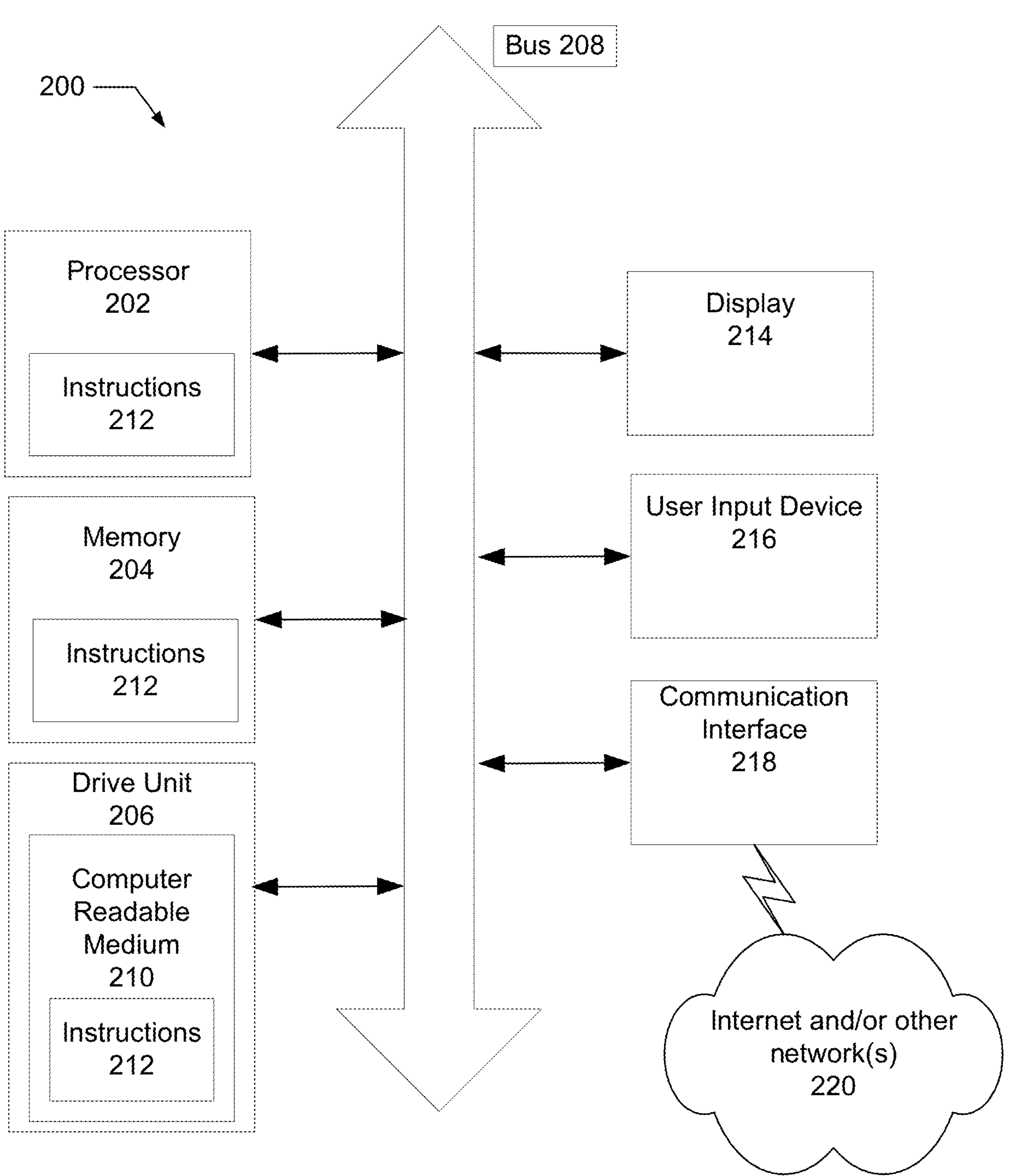
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
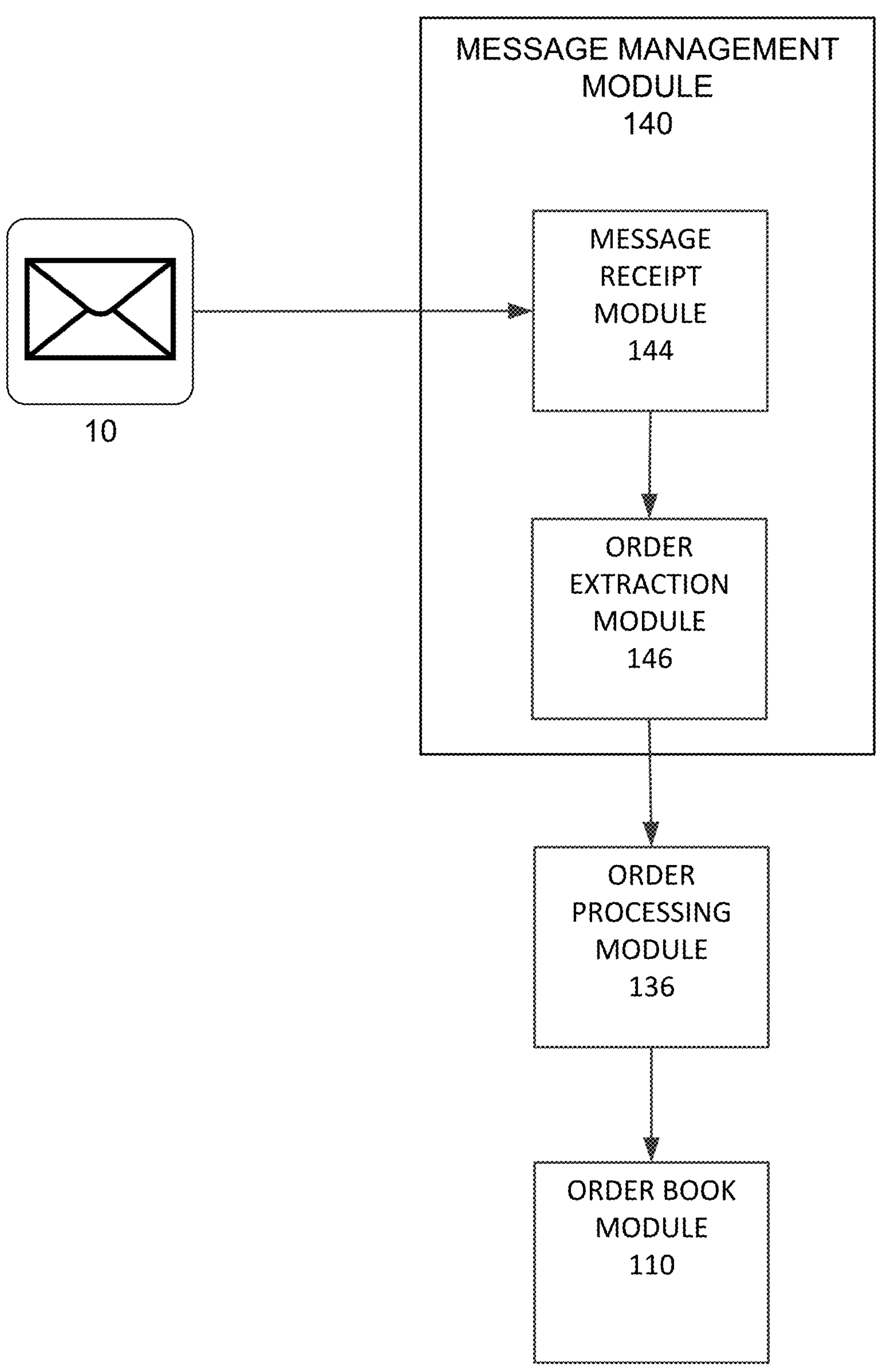
FIG. 3 depicts an example market order message management system for implementing the disclosed embodiments.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway 710), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements and may be configured as part of the order book module 110, part of the message management module 140, or as an independent functioning module.

Certain embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX SBE (Simple Binary Encoding), or by an exchange-provided API.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period. For example, the particular time may be a specific amount of time, such as 10 milliseconds, prior to the ending time of an order accumulation period in a group auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

Figure 4:
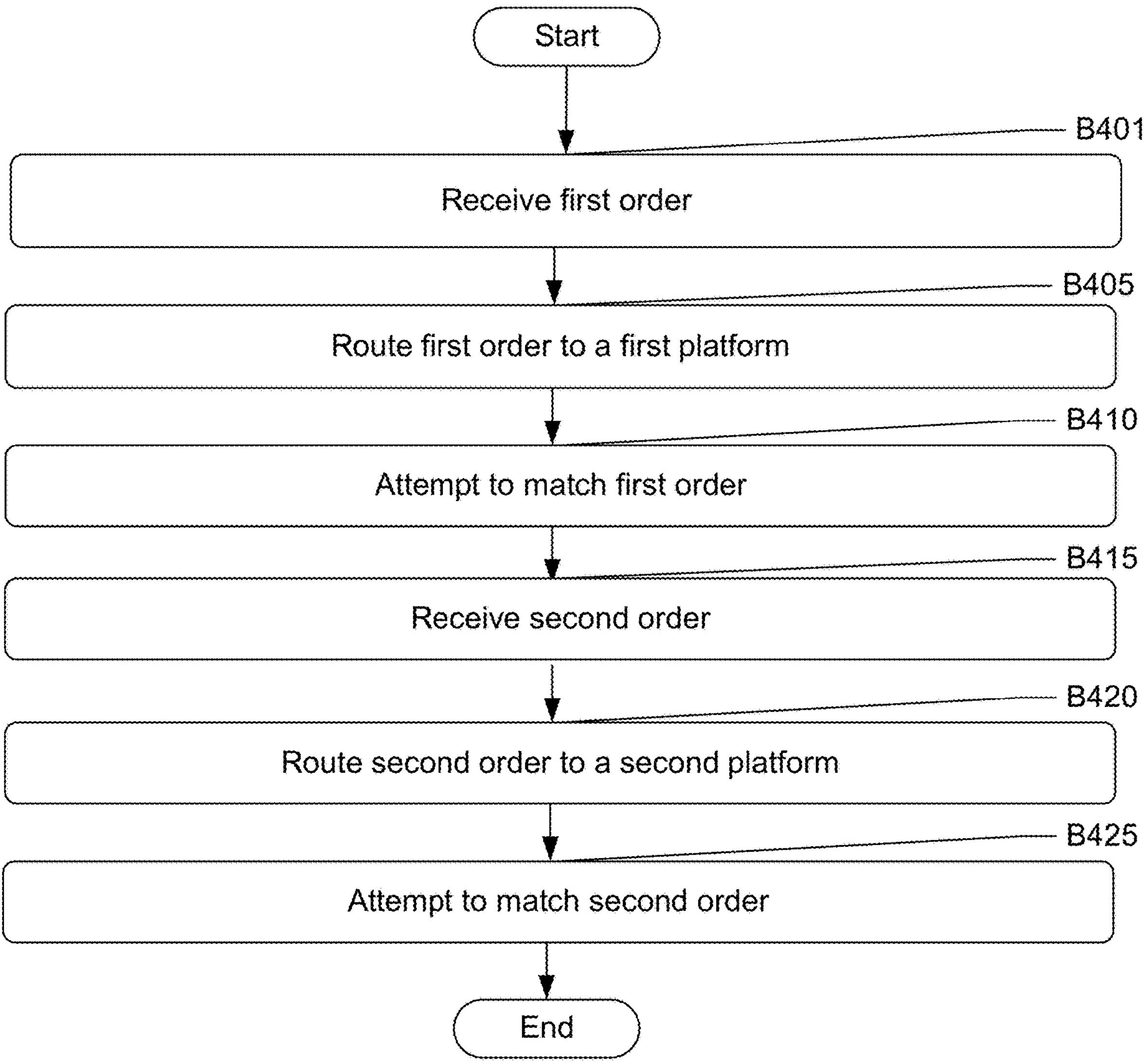
FIG. 4 depicts a flow chart showing operation of the system of FIGS. 1 and 2.

FIG. 4 illustrates a flow chart for an example embodiment of Multi-Modal Trade Execution with Smart Order Routing. In particular FIG. 4 shows a computer implemented method for matching, or otherwise allocating, a first, e.g., incoming, order to trade a financial product with one or more of a set of previously received unmatched orders, i.e., resting, for the product which are counter thereto, e.g., at the same or better price than the first order. In one embodiment, the financial product is a derivative product such as a futures contract or option contract on a futures contract. Alternatively, or in addition thereto, the financial product may include a cash-market instrument, such as a swap.

In one embodiment a second electronic pool of liquidity can be introduced while at the same time maintaining legacy execution systems. In other words, the same financial instrument can be listed on two different matching engines (either on the same server or separately). Customers can choose which execution style they would prefer in their orders. For customers that don't care or are not sophisticated enough to decide what market is best for them, a smart order router would route the customer's order to the best execution platform. This means that a customer's order would be automatically sent to a trade matching engine which has the best price and quantity for the instrument.

At block B401, a first order for a financial product is received. The first order (transaction) may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

At block B405, the first order is routed to a first platform. In certain embodiments, the first platform may be a first order book. In certain embodiments, an order processor may select an order book based on preferences or market conditions. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product. A continuous market order book is an order book made up of limit orders what are processed continuously as time moves forward. Other types of order books or markets may be used. For example, an order book without limits and/or banding, or an order book that does not generate market data may be used. Other types of markets may use alternative current or future matching algorithms. In certain embodiments, multiple order books may be maintained for the financial product. Each order book may be maintained by a single match engine. In certain embodiments, a single match engine may maintain multiple order books.

At block B410, a match engine attempts to match the first order using a first matching algorithm. If the match engine identifies one or more suitable previously received but unsatisfied counter orders, they, and the first order, are matched to execute a trade there between to at least partially satisfy the quantities of one or both the first order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the first order, the first order is placed on the order book, referred to as "resting", with original or remaining unsatisfied quantity, to await a subsequently received suitable order counter thereto. The match engine then generates match event data reflecting the result of this matching process.

At block B415, a second order for the financial product is received. The second order may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

At block B420, the second order is routed to a second platform. In certain embodiments the second order may be a second order book. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. In certain embodiments, multiple order books may be maintained for the financial product.

At block B425, a second match engine attempts to match the second order using a second matching algorithm. If the match engine identifies one or more suitable previously received but unsatisfied counter orders, they, and the second order, are matched to execute a trade there between to at least partially satisfy the quantities of one or both the second order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the second order, the second order is placed on the order book, referred to as "resting", with original or remaining unsatisfied quantity, to await a subsequently received suitable order counter thereto. The match engine then generates match event data reflecting the result of this matching process.

In certain embodiments, the second match engine and the first match engine may use different matching or allocation algorithms to match order. For example, the first match engine may be following FIFO while the second match engine is using Pro Rata. Because the match engines are matching differently, the first book and second book will have different outcomes. Different matching algorithms are discussed above and may include FIFO, Group Auctions, Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, and Split Price-Time Pro-Rata among others.

Figure 5:
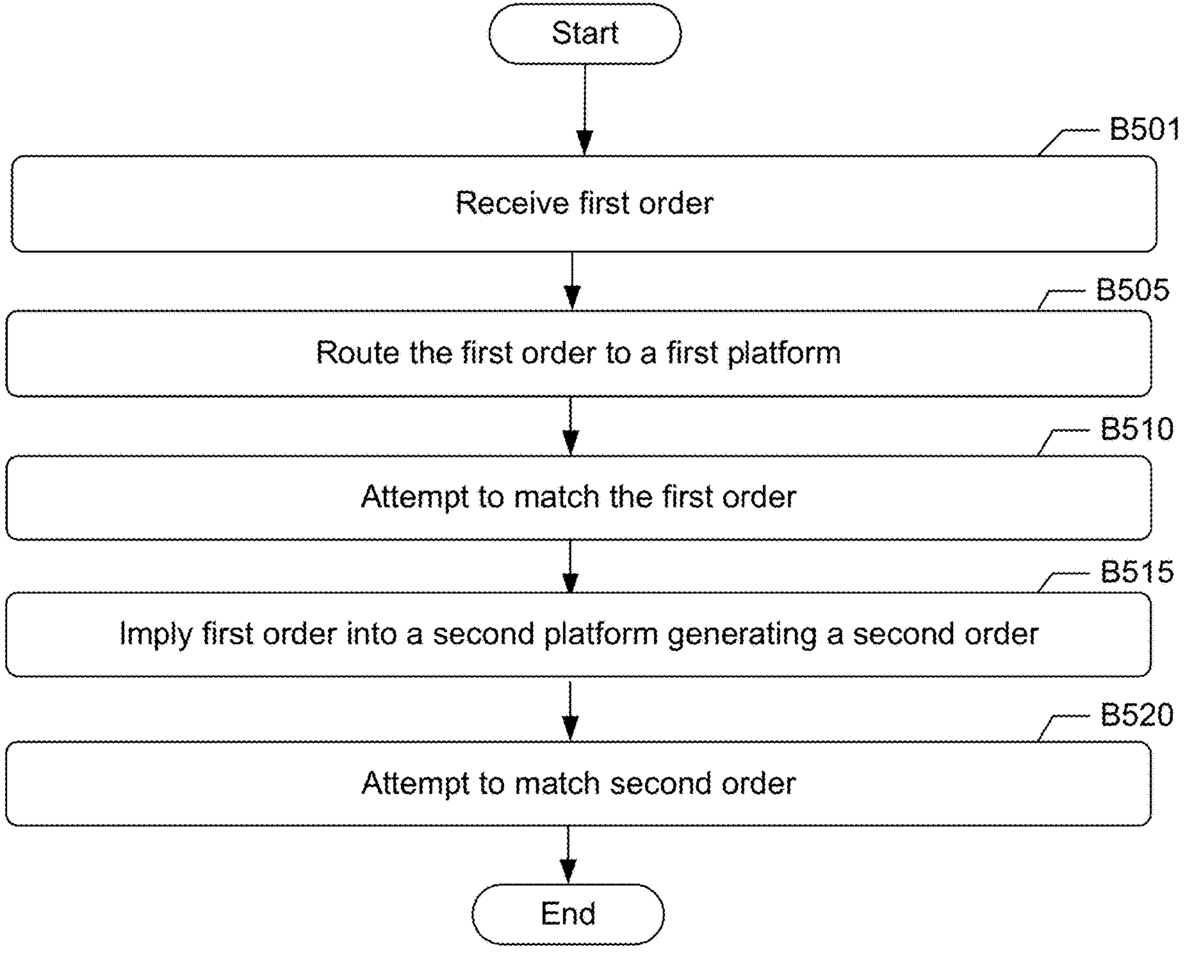
FIG. 5 depicts a flow chart showing operation of the system of FIGS. 1 and 2.

FIG. 5 illustrates a flow chart for an example embodiment of Multi-Modal Trade Execution with Smart Order Routing. In one embodiment the smart order router could be replaced or supplemented/augmented with implied orders and trades to link two pools of liquidity. This will allow customers to attempt to match against their preferred method of execution, and if that method is not available match their orders in an implied market thus always providing a unified pool of liquidity.

At block B501, a first order for a financial product is received. The first order (transaction) may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting/canceling a previously submitted order. In an embodiment, the financial product may be based on an associated financial instrument which the electronic market is established to trade. The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

At block B505, the first order is routed to a first platform. In certain embodiments, the first platform may be a first order book. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product. A Central Limit Order Book (CLOB) is an order book made up of limit orders that is processed continuously as time moves forward. In certain embodiments, multiple order books may be maintained for the financial product. In certain embodiments, a smart router may be used to route the first order to a preferred order book. For example, a customer may prefer an order book running a FIFO algorithm. Multiple order books may exist for each financial product. Each order book may be using the same match engine or separate match engines. Each order book may be running a different match algorithm.

At block B510, a match engine attempts to match the first order using a first matching algorithm. If the match engine identifies one or more suitable previously received but unsatisfied counter orders, they, and the first order, are matched to execute a trade there between to at least partially satisfy the quantities of one or both the first order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the first order, the first order is placed on the order book, referred to as "resting", with original or remaining unsatisfied quantity, to await a subsequently received suitable order counter thereto. The match engine then generates match event data reflecting the result of this matching process.

At block B515, the first order is implied into a second platform creating a second order on the second platform. The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

At block B520, a second match engine attempts to match the second order using a second matching algorithm. If the second match engine identifies one or more suitable previously received but unsatisfied counter orders, they, and the first order, are matched to execute a trade there between to at least partially satisfy the quantities of one or both the first order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the first order, the first order is placed on the order book, referred to as "resting", with original or remaining unsatisfied quantity, to await a subsequently received suitable order counter thereto. The second match engine then generates match event data reflecting the result of this matching process.

In certain embodiments, the second match engine and the first match engine may use different matching or allocation algorithms to match the order. For example, the first match engine may be following FIFO while the second match engine is using Pro Rata. Because the match engines are matching differently, the first book and second book will have different outcomes. Different matching algorithms are discussed above and may include FIFO, Group Auction, Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, and Split Price-Time Pro-Rata among others.

Figure 6:
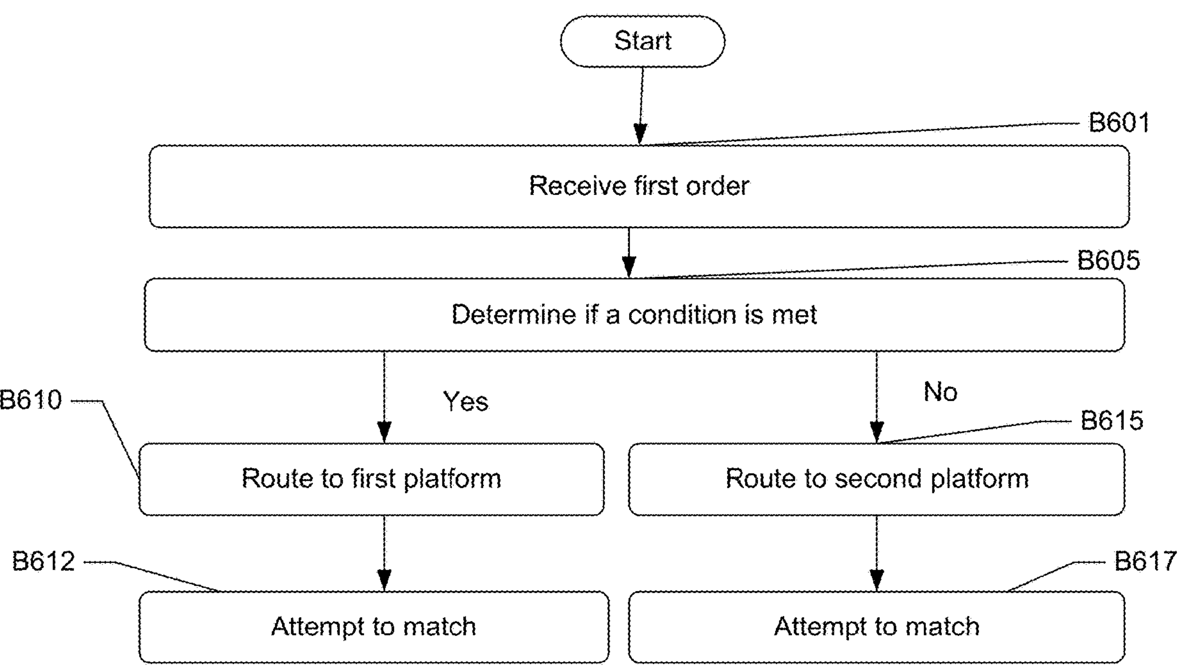
FIG. 6 depicts a flow chart showing operation of the system of FIGS. 1 and 2.

FIG. 6 illustrates a flow chart for an example embodiment of Multi-Modal Trade Execution with Smart Order Routing. In one embodiment the system consists of a single matching engine and set of financial instruments and the mode of execution is determined by configurable parameters such as market state. For example, during regular open markets a matching engine might match orders in a FIFO manner but in extended trading hours the matching algorithm might change to a Pro Rata algorithm. The pools of liquidity remain unified, and the mode of execution changes based on the liquidity profile. In this instance customers would not need to explicitly provide instructions for a preferred mode of execution. Resting orders which go from regular trading market state to Pro Rata market state would be automatically considered for the present style of execution. Both execution platforms with different trading modes will send the same instrument for clearing. Everything relating to post trade execution should function as it does today.

At block B601, a first order for a financial product is received. The first order (transaction) may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

At block B605, a router (order processor) determines if a condition is met. The router may be a smart router. A smart router may be a device which decides to which match engine an order will be routed based on some algorithm or otherwise based on historical/state information (events which happened in the past such as prior orders) and/or stateless information (information about the current transaction, trader). Smart (or intelligent) routing may be based on historical data or the current market. Smart routing may be based on recent traffic received from a customer or similar customers. Smart routing may be based on the time of day or the time to expiration of the market. The smart router may be a model of the FIX server FIXEdge or FIX Simple Binary Encoding (SBE). A smart router or Gateway 710 may be configured to determine if the condition is met such as the time of day or time to expiration for the financial product. Other conditions may include volatility level, best ask and/or best bid prices, trading volume exceed a threshold. A condition may include the magnitude of the value or if the rate of change of the value exceeds a threshold. The condition may include other characteristics of the operation of the market.

At block B610, if the condition is met, the router routes the first order to the first platform. At Block B612, a match engine attempts to match the first order using a first matching algorithm. If the match engine identifies one or more suitable previously received but unsatisfied counter orders, they, and the first order, are matched to execute a trade there between to at least partially satisfy the quantities of one or both the first order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the first order, the first order is placed on the order book, referred to as "resting", with original or remaining unsatisfied quantity, to await a subsequently received suitable order counter thereto. The match engine then generates match event data reflecting the result of this matching process.

At block B615, if the condition is not met, the router routes the first order to the second platform. At Block B617, a second match engine attempts to match the first order using a second matching algorithm. If the second match engine identifies one or more suitable previously received but unsatisfied counter orders, they, and the first order, are matched to execute a trade there between to at least partially satisfy the quantities of one or both the first order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the first order, the first order is placed on the order book, referred to as "resting", with original or remaining unsatisfied quantity, to await a subsequently received suitable order counter thereto. The match engine then generates match event data reflecting the result of this matching process.

Figure 7A:
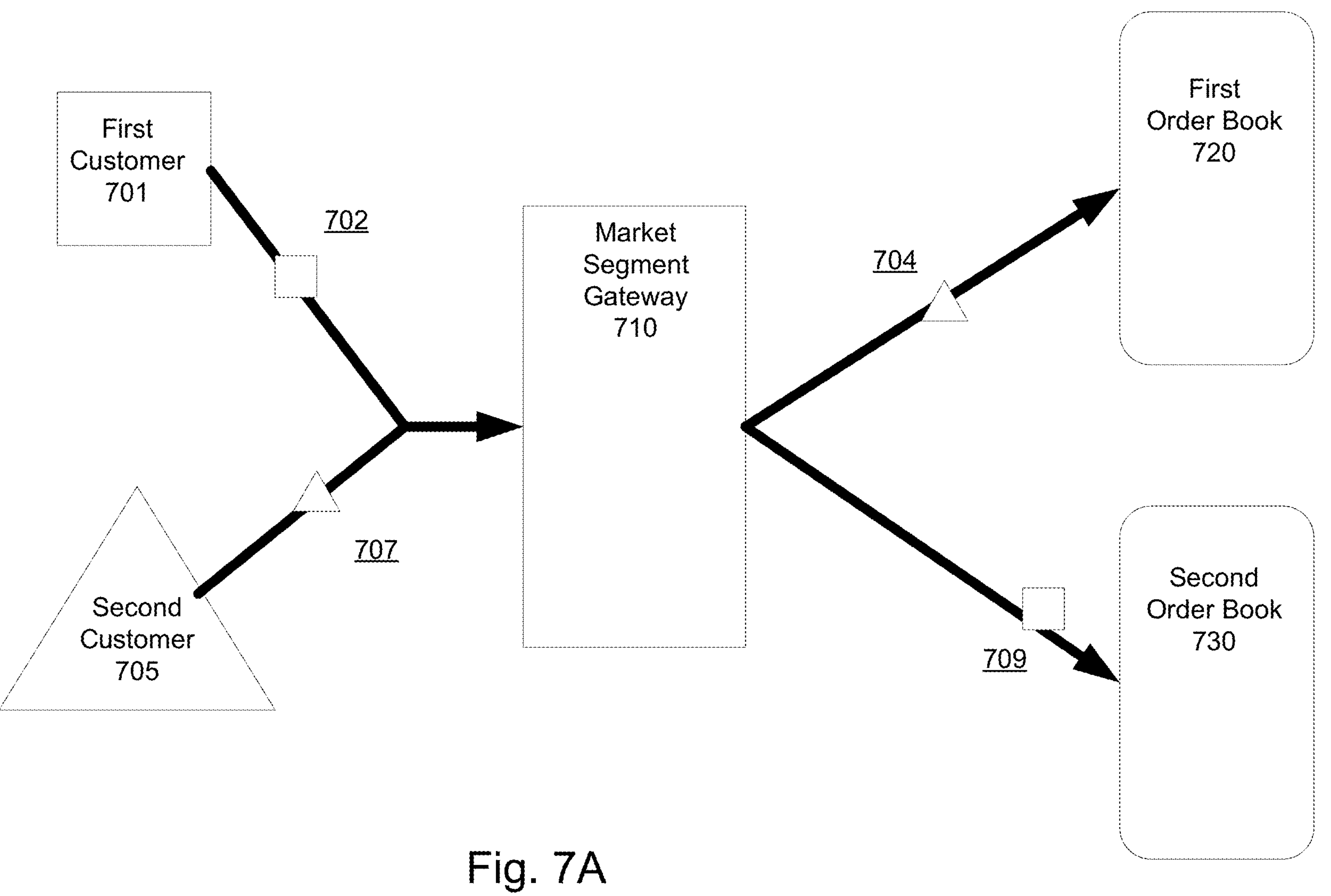
FIGS. 7A-7B depict embodiments of the application of the system of FIGS. 1 and 2.

FIG. 7A illustrates an example embodiment for Multi-Modal Trade Execution with Smart Order Routing. FIG. 7A includes a First Customer 701, a Second Customer 705, a Market Segment Gateway 710, a first order book 720, and a second order book 730. FIG. 7A also contains four orders 702, 704, 707, and 709. The orders 702 and 709 originate from the first customer 701. The orders 704 and 707 originate from the second customer 705.

The first customer 701 and second customer 705 are configured to transmit trades to the Market Segment Gateway 710. The first customer 701 has a preference for using Pro Rata to match orders. The second customer has no preference.

The Market Segment Gateway 710 is configured to receive orders from customers, decode the orders, and route the orders to the appropriate match engine or order book. The Market Segment Gateway 710 is also configured to intelligently route the customers' orders if there is no preference. In certain embodiments the Market Segment Gateway 710 is a smart router in other embodiments the Gateway 710 makes no decisions other than to obey the customers' preference or a default choice.

In certain embodiments, the Gateway 710 receives market data from a matching engine that indicates the status of the market. The Gateway 710 may route an order to a specific order book if there is a better offer there within. Smart (or intelligent) routing may be based on historical data or the current market. Smart routing may be based on recent traffic received from a customer or similar customers. Smart routing may be based on the time of day or the time to expiration of the market. The smart router may be a model of the FIX server FIXEdge or FIX SBE.

For this example, the first order book 720 is a continuous market order book following a first in first out algorithm (FIFO CLOB). The second order book may be a Pro Rata order book 730. The second order book 730 may be using a pro rata matching algorithm. The first and second order books may be for the same or equivalent financial instruments. An equivalent financial instrument may have similar quoting and pricing conventions. In certain embodiments, there may be more than two order books. Each order book may be aligned with a separate match engine 106. Each order book may be a different type of order book or follow different matching algorithms. For example, in certain embodiments there may be a third order book using a match engine with a threshold pro-rata matching algorithm. Other matching algorithms that may be used include: FIFO, Group Auction, Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, and Split Price-Time Pro-Rata among others.

In this example, the orders from the first customer 701 may indicate a preference for Pro Rata algorithm. When those order hit the Market Segment Gateway 710, the Gateway 710 routes the orders to the second order book 730 which is using a Pro Rata algorithm.

The orders from the second customer 705 indicate no preference. When the order hit the Market Segment Gateway 710, the Gateway 710 either intelligently routes the order (using a smart router) or uses a default setting. In the example in FIG. 7A, the default setting is for FIFO. Orders such as 704 and 707 will be routed to the first order book.

Figure 7B:
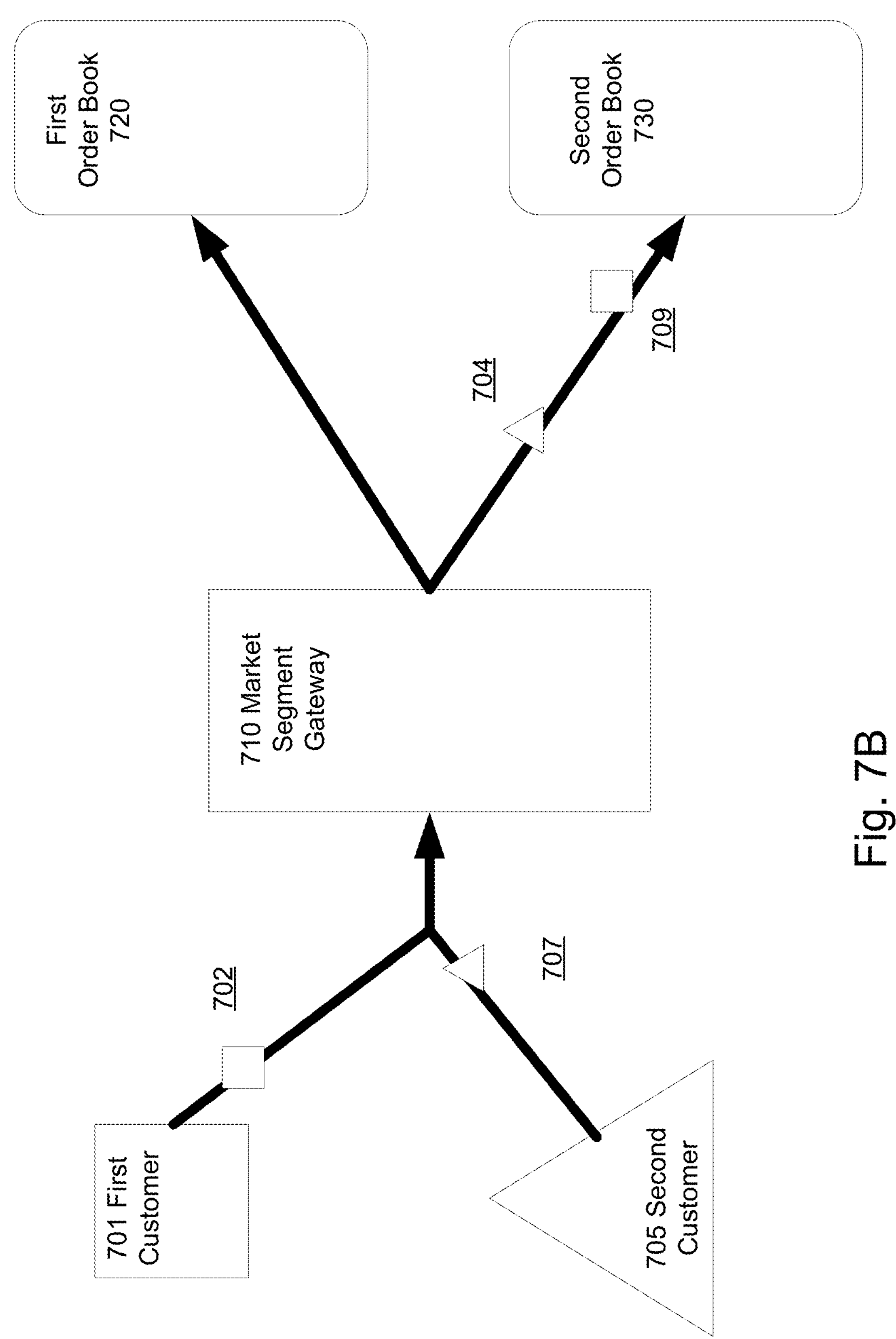

FIG. 7B illustrates an example embodiment for Multi-Modal Trade Execution with Smart Order Routing. The first customer 701 and second customer 705 are configured to transmit trades to the Market Segment Gateway 710. The Market Segment Gateway 710 (also referred to as an order processor) is configured to receive orders from customers, decode the orders, and route the orders to the appropriate match engine or order book. The Market Segment Gateway 710 is also configured to intelligently route the customers' order if there is no preference. In certain embodiments the Market Segment Gateway 710 is a smart router in other embodiments the Gateway 710 makes no decisions other than to obey the customers' preference or a default choice.

In certain embodiments, the Gateway 710 receives market data from a matching engine that indicates the status of the market. The Gateway 710 may route an order to a specific order book if there is a better offer there within. Smart (or intelligent) routing may be based on historical data or the current market. Smart routing may be based on recent traffic received from a customer or similar customers. Smart routing may be based on the time of day or the time to expiration of the market. The smart router may be a model of the FIX server FIXEdge or FIX SBE.

For this example, the first order book 720 is a continuous market order book using a match engine with a pro rata algorithm. The second order book 730 may be an order book using a match engine with a FIFO matching algorithm. In certain embodiments, there may be more than two order books. Each order book may be aligned with a separate match engine 106. Each order book may be a different type of order book or follow different matching algorithms. For example, in certain embodiments there may be a third order book using a match engine with a per rata matching algorithm. Other matching algorithms that may be used include: FIFO, Group Auction, Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, and Split Price-Time Pro-Rata among others.

In FIG. 7B, the Gateway 710 is configured to route orders based on the time of day that they were received. In certain embodiments, the gateway 710 may be configured to use alternative conditions. Other conditions may include volatility level, best ask and/or best bid prices, trading volume exceed a threshold. A condition may include the magnitude of the value or if the rate of change of the value exceeds a threshold. The condition may include other characteristics of the operation of the market. In this example, the Gateway 710 is configured to route all orders received during electronic trading hours (ETH) to the second order book 730. The Gateway 710 is configured to route all orders received during regular trading hours (RTH) to the first order book 720. In FIG. 7B, orders 707, 704, and 709 are received during ETH. As such, they will all be routed to the second order book 730. Order 702 will not be received until RTH. As such, when it arrives at the Gateway 710, it will be routed to the first order book 720.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for matching, without disrupting a structure of an electronic market, each of a plurality of orders to trade a financial instrument in the electronic market with one or more of a set of previously received unmatched orders for the financial instrument which are counter thereto, the computer implemented method comprising:

receiving, by a market segment gateway, a first electronic data transaction request message from a client computer of a user via a network comprising data indicative of a first order of the plurality of orders, the first order specifying a financial instrument, a first quantity, and a first value, wherein the first order does not include data indicative of a matching algorithm preference of a plurality of matching algorithms, whereby the market segment gateway is configured to operate in multiple modes simultaneously to accept and match the plurality of orders for the same financial instrument;

evaluating, by the market segment gateway, for each of a plurality of order books for the financial instrument, a plurality of market conditions currently existing for each order book, each order book of the plurality of order books stored in a non-transitory memory and providing a separate pool of liquidity for the financial instrument, and coupled with one of a plurality of hardware matching processors, each hardware matching processor implementing one of the plurality of matching algorithms which is different from all other matching algorithms implemented by the other plurality of hardware matching processors for that financial instrument and which is not altered during trading hours for that financial instrument to follow a different matching algorithm, each hardware matching processor configured to execute orders for each order book according to the implemented matching algorithm;

determining, for the first order, a default order book or an order book having a best bid and ask for the financial instrument based on evaluating the plurality of market conditions;

selecting, by the market segment gateway, based on evaluating the plurality of market conditions and determining the default order book or the order book having the best bid and ask for the financial instrument, a first order book from the plurality of order books for the first order, the first order book coupled with a first hardware matching processor of the plurality of hardware matching processors, the first hardware matching processor following a first matching algorithm;

routing, by the market segment gateway, the first order to the selected first order book; and attempting to match, by the first hardware matching processor, the first order with a previously received but unsatisfied order counter to the first order stored in the selected first order book.

2. The computer implemented method of claim 1, wherein the first hardware matching processor follows a first in first out algorithm.

3. The computer implemented method of claim 1, wherein the plurality of matching algorithms include first in first out, Group Auction, Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, and Split Price-Time Pro-Rata.

4. The computer implemented method of claim 1, wherein the plurality of market conditions include one or more of a time of day, a time to expiration for the financial instrument, a volatility level of the financial instrument, a best ask for the financial instrument, a best bid price for the financial instrument, a threshold trading volume, or whether a magnitude of the first value or if a rate of change of the first value exceeds a threshold value.

5. The computer implemented method of claim 1, wherein the plurality of market conditions include historical or current market data.

6. The computer implemented method of claim 1, wherein the financial instrument comprises a derivative product.

7. The computer implemented method of claim 1, wherein the first order includes data indicative of a best price preference, and wherein selecting the first order book for the first order comprises:

determining, by the market segment gateway, a best price for the first order; and selecting, by the market segment gateway, the first order book based on the determining.

8. The computer implemented method of claim 1, further comprising:

receiving, by the market segment gateway, a second electronic data transaction request message, the second electronic data transaction request message and the first electronic data transaction request message received sequentially, the second electronic data transaction request message comprising data indicative of a second order of the plurality of orders, the second order specifying the same financial instrument, a second quantity, a second value, and data indicative of a preference for a second matching algorithm;

routing, by the market segment gateway, based on the data indicative of the preference for the second matching algorithm, the second order to one of the plurality of order books, the routing further comprising:

selecting, by the market segment gateway, based on the data indicative of the preference, a second order book from the plurality of order books for the financial instrument, the second order book coupled with a second hardware matching processor of the plurality of hardware matching processors, the second hardware matching processor following the second matching algorithm; and routing, by the market segment gateway, the second order to the second order book; and attempting to match, with the second hardware matching processor, the second order with a previously received but unsatisfied order counter thereto to the second order stored in the second order book coupled with a second hardware matching processor, the second hardware matching processor following the second matching algorithm, the first and second hardware matching processors following different matching algorithms.

9. The computer implemented method of claim 8, wherein the second hardware matching processor follows a Pro Rata algorithm.

10. A system for matching, without disrupting a structure of an electronic market, each of a plurality of orders to trade a financial instrument in the electronic market with one or more of a set of previously received unmatched orders for the financial instrument which are counter thereto, the system comprising:

a non-transitory memory coupled with an order processor;

a plurality of order books stored in the non-transitory memory, wherein each order book of the plurality of order books provides a separate pool of liquidity for the financial instrument and is coupled with one of a plurality of hardware matching processors, wherein each hardware matching processor implements one of a plurality of matching algorithms which is different from all other matching algorithms implemented by the other plurality of hardware matching processors for that financial instrument and which is not altered during trading hours for that financial instrument to follow a different matching algorithm, each hardware matching processor configured to execute orders for each order book according to the implemented matching algorithm;

a market segment gateway, implemented by the order processor, configured to:

receive a first electronic data transaction request message from a client computer of a user via a network comprising data indicative of a first order of the plurality of orders, the first order specifying a financial instrument, a first quantity, and a first value, wherein the first order does not include data indicative of a matching algorithm preference of a plurality of matching algorithms, whereby the market segment gateway is configured to operate in multiple modes simultaneously to accept and match the plurality of orders for the same financial instrument;

evaluate, for each of the plurality of order books for the financial instrument, a plurality of market conditions currently existing for each order book;

determine, for the first order, a default order book or an order book having a best bid and ask for the financial instrument based on the evaluation;

select, based on the evaluation of the plurality of market conditions and the determination of the default order book or the order book having a best bid and ask for the financial instrument, a first order book from the plurality of order books for the first order, the first order book coupled with a first hardware matching processor of the plurality of hardware matching processors, the first hardware matching processor following a first matching algorithm; and route the first order to the selected first order book, wherein the first hardware matching processor attempts to match the first order with a previously received but unsatisfied order counter to the first order stored in the selected first order book.

11. The system of claim 10, wherein the first hardware matching processor follows a first in first out algorithm.

12. The system of claim 10, wherein the plurality of market conditions include one or more of a time of day, a time to expiration for the financial instrument, a volatility level of the financial instrument, a best ask for the financial instrument, a best bid price for the financial instrument, a threshold trading volume, or whether a magnitude of the first value or if a rate of change of the first value exceeds a threshold value.

13. The system of claim 10, wherein the plurality of market conditions include historical or current market data.

14. The system of claim 10, wherein the financial instrument comprises a derivative instrument.

15. The system of claim 10, wherein the first order includes data indicative of a best price preference, and wherein selecting the first order book for the first order comprises:

determining, by the market segment gateway, a best price for the first order; and selecting, by the market segment gateway, the first order book based on the determining.

16. The system of claim 10, wherein the market segment gateway is further configured to:

receive a second electronic data transaction request message, the second electronic data transaction request message and the first electronic data transaction request message received sequentially, the second electronic data transaction request message comprising data indicative of a second order of the plurality of orders, the second order specifying the same financial instrument, a second quantity, a second value, and data indicative of a preference for a second matching algorithm;

route, based on the data indicative of the preference for the second matching algorithm, the second order to one of the plurality of order books, wherein the market segment gateway is further configured to:

select, based on the data indicative of the preference, a second order book from the plurality of order books for the financial instrument, the second order book coupled with a second hardware matching processor of the plurality of hardware matching processors, the second hardware matching processor following the second matching algorithm; and route the second order to the second order book; and wherein the second hardware matching processor attempts to match the second order with a previously received but unsatisfied order counter thereto to the second order stored in the second order book coupled with a second hardware matching processor, the second hardware matching processor following the second matching algorithm, the first and second hardware matching processors following different matching algorithms.

17. The system of claim 16, wherein the second hardware matching processor follows a Pro Rata algorithm.

18. A system for matching, without disrupting a structure of an electronic market, each of a plurality of orders to trade a financial instrument in the electronic market with one or more of a set of previously received unmatched orders for the financial instrument which are counter thereto, the system comprising:

means for receiving a first electronic data transaction request message from a client computer of a user via a network comprising data indicative of a first order of the plurality of orders, the first order specifying a financial instrument, a first quantity, and a first value, wherein the first order does not include data indicative of a matching algorithm preference of a plurality of matching algorithms, whereby the system is configured to operate in multiple modes simultaneously to accept and match the plurality of orders for the same financial instrument;

means for evaluating, for each of a plurality of order books for the financial instrument, a plurality of market conditions currently existing for each order book, each order book of the plurality of order books stored in a non-transitory memory and providing a separate pool of liquidity for the financial instrument, and coupled with one of a plurality of hardware matching processors, each hardware matching processor implementing one of the plurality of matching algorithms which is different from all other matching algorithms implemented by the other plurality of hardware matching processors for that financial instrument and which is not altered during trading hours for that financial instrument to follow a different matching algorithm, each hardware matching processor configured to execute orders for each order book according to the implemented matching algorithm;

means for determining, for the first order, a default order book or an order book having a best bid and ask for the financial instrument based on evaluating the plurality of market conditions;

means for selecting, based on evaluating the plurality of market conditions and determining the default order book or the order book having the best bid and ask, a first order book from the plurality of order books for the first order, the first order book coupled with a first hardware matching processor of the plurality of hardware matching processors, the first hardware matching processor following a first matching algorithm;

means for routing the first order to the selected first order book; and means for attempting to match the first order with a previously received but unsatisfied order counter to the first order stored in the selected first order book.

19. The system of claim 18, wherein the plurality of market conditions include one or more of a time of day, a time to expiration for the financial instrument, a volatility level of the financial instrument, a best ask for the financial instrument, a best bid price for the financial instrument, a threshold trading volume, or whether a magnitude of the first value or if a rate of change of the first value exceeds a threshold value.

20. The system of claim 18, further comprising:

means for receiving a second electronic data transaction request message, the second electronic data transaction request message and the first electronic data transaction request message received sequentially, the second electronic data transaction request message comprising data indicative of a second order of the plurality of orders, the second order specifying the same financial instrument, a second quantity, a second value, and data indicative of a preference for a second matching algorithm;

means for routing, based on the data indicative of the preference for the second matching algorithm, the second order to one of the plurality of order books, the routing further comprising:

means for selecting, based on the data indicative of the preference, a second order book from the plurality of order books for the financial instrument, the second order book coupled with a second hardware matching processor of the plurality of hardware matching processors, the second hardware matching processor following the second matching algorithm; and means for routing, the second order to the second order book; and means for attempting to match the second order with a previously received but unsatisfied order counter thereto to the second order stored in the second order book coupled with a second hardware matching processor, the second hardware matching processor following the second matching algorithm, the first and second hardware matching processors following different matching algorithms.

* * * * *